US009800363B2

United States Patent
Xu et al.

(10) Patent No.: US 9,800,363 B2
(45) Date of Patent: Oct. 24, 2017

(54) NAICS SIGNALING FOR ADVANCED LTE FEATURES

(71) Applicant: QUALCOMM Incorporated, San Diego, CA (US)

(72) Inventors: Hao Xu, San Diego, CA (US); Peter Gaal, San Diego, CA (US); Wanshi Chen, San Diego, CA (US); Tao Luo, San Diego, CA (US); Alexei Gorokhov, San Diego, CA (US); Michael McCloud, San Diego, CA (US); Tingfang Ji, San Diego, CA (US)

( * ) Notice: Subject to any disclaimer, the term of this patent is extended or adjusted under 35 U.S.C. 154(b) by 130 days.

(21) Appl. No.: 14/702,515

(22) Filed: May 1, 2015

(65) Prior Publication Data

US 2015/0372778 A1 Dec. 24, 2015

Related U.S. Application Data

(60) Provisional application No. 62/014,107, filed on Jun. 18, 2014.

(51) Int. Cl.
*H04W 24/00* (2009.01)
*H04W 80/04* (2009.01)
(Continued)

(52) U.S. Cl.
CPC ......... *H04J 11/005* (2013.01); *H04W 72/042* (2013.01); *H04W 72/082* (2013.01);
(Continued)

(58) Field of Classification Search
CPC . H04W 28/18; H04W 72/042; H04W 84/042; H04W 24/00; H04W 80/04;
(Continued)

(56) References Cited

U.S. PATENT DOCUMENTS

2013/0242744 A1* 9/2013 Wigren ................. H04W 24/02 370/236
2015/0098440 A1* 4/2015 Yang .................... H04J 11/0056 370/330

(Continued)

FOREIGN PATENT DOCUMENTS

WO 2015088688 6/2015

OTHER PUBLICATIONS

Ericsson: "RAN 4 scope for NAICS work (R1-142734)", 3GPP Draft, vol. RAN WG4, No. Seoul, Korea; May 19, 2014 May 23, 2014 May 18, 2014 (May 18, 2014), ;W050797550, 3rd Generation Partnership Project (3GPP). Mobile Competence Centre ; 650, Route Des Lucioles ; F-06921 Sophia-Antipolis Cedex ; France Retrieved from the Internet: URL: http://www.3gpp.org/ftp/Meetings_3GPP_SYNC/RAN4/Docs/ [retrieved on May 18, 2014] section 3.5.

(Continued)

*Primary Examiner* — Andrew Lee
(74) *Attorney, Agent, or Firm* — Arent Fox, LLP

(57) ABSTRACT

A method, an apparatus, and a computer program product for wireless communication are provided. The apparatus may be a user equipment that receives interference cancellation information from a base station. Various aspects are described for employing interference cancellation information perform interference suppression in the presence of interference associated with different component carriers when employing carrier aggregation, small cell discovery signals, variations in data channel transmissions associated with certain transmission modes, and higher order QAM rates.

30 Claims, 12 Drawing Sheets

(51) Int. Cl.
*H04J 11/00* (2006.01)
*H04W 72/04* (2009.01)
*H04W 72/08* (2009.01)
*H04L 5/00* (2006.01)
*H04L 27/26* (2006.01)

(52) U.S. Cl.
CPC ............ *H04L 5/001* (2013.01); *H04L 5/0035* (2013.01); *H04L 5/0044* (2013.01); *H04L 5/0073* (2013.01); *H04L 27/2647* (2013.01)

(58) Field of Classification Search
CPC .... H04L 5/0007; H04L 1/0048; H04J 11/005; H04J 11/00
See application file for complete search history.

(56) References Cited

U.S. PATENT DOCUMENTS

| | | | | |
|---|---|---|---|---|
| 2015/0296540 A1* | 10/2015 | Yum | ............... | H04J 11/00 370/329 |
| 2015/0326290 A1* | 11/2015 | Harrison | ............... | H04B 7/0456 375/260 |
| 2015/0349933 A1* | 12/2015 | Davydov | ............... | H04L 5/0073 375/219 |
| 2015/0365178 A1* | 12/2015 | Maattanen | ............... | H04B 17/345 370/329 |
| 2015/0365880 A1* | 12/2015 | Malladi | ............... | H04L 5/0007 370/312 |
| 2015/0372778 A1* | 12/2015 | Xu | ............... | H04J 11/005 370/329 |
| 2016/0080963 A1* | 3/2016 | Marinier | ............... | H04L 5/0053 370/252 |
| 2016/0359578 A1* | 12/2016 | Yamada | ............... | H04W 72/0406 |
| 2016/0374056 A1* | 12/2016 | Yamada | ............... | H04J 11/005 |
| 2017/0006501 A1* | 1/2017 | Sesia | ............... | H04W 28/18 |

OTHER PUBLICATIONS

LG Electronics: Consideration on the number of candidate interferers and UE capability (R1-143196)% 3GPP Draft , vol. RAN WG1, No. Dresden, Germany; Aug. 18, 2014-Aug. 22, 2014 Aug. 10, 2014 (Aug. 10, 2014), XP050815588, 3rd Generation Partnership Project (3GPP), Mobile Competence Centre ; 650. Route Des Lucioles ; F-06921 Sophia-Antipolis Cedex ; France Retrieved from the Internet: URL: http://www.3gpp.org/ftp/tsg_ran/WG1_RL1/TSGR1_78/Docs/ [retrieved on Aug. 10, 2014] section 2: question 4.

NTT DOCOMO: "Views on Higher Layer Signaling for NAICS (R1-141474)", 3GPP Draft vol. RAN WG1, No. Shenzhen, China; Mar. 31, 2014-Apr. 4, 2014 Mar. 30, 2014 (Mar. 30, 2014), XP050787143, 3rd Generation Partnership Project (3GPP), Mobile Competence Centre ; 650, Route Des Lucioles ; F-06921 Sophia-Ahtipolis Cedex France Retrieved from the Internet: URL: http://www.3gpp.org/ftp/Meetings_3GPP_SYNC/RAN1/Docs/ [retrieved on Mar. 30, 2014] sections 1, 2.

Partial International Search Report—PCT/US2015/029092—ISA/EPO—dated Aug. 24, 2015.

Ericsson: "Analysis of Semi-Static Parameters for Blind Detection", 3GPP Draft; R4-142737 SEMI STATIC-V4, 3rd Generation Partnership Project (3GPP), Mobile Competence Centre, 650, Route Des Lucioles, F-06921 Sophia-Antipolis Cedex, France, vol. RAN WG4, No. Seoul, Korea, May 19, 2014-May 23, 2014, May 18, 2014.

International Search Report and Written Opinion—PCT/US2015/029092—ISA/EPO—dated Dec. 16, 2015.

\* cited by examiner

NAICS SIGNALING FOR ADVANCED LTE FEATURES

CROSS-REFERENCE TO RELATED APPLICATION

This application claims the benefit of U.S. Provisional Application Ser. No. 62/014,107, entitled "NAICS SIGNALING FOR ADVANCED LTE FEATURES" and filed on Jun. 18, 2014 which is expressly incorporated by reference herein in its entirety.

BACKGROUND

Field

The present disclosure relates generally to communication systems, and more particularly, to network assisted interference cancellation and suppression (NAICS) signaling for advanced long-term evolution (LTE) features.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Network assisted signaling is being developed and standardized to support advanced receiver operation. How to signal to support an advanced receiver is an active topic of research. Prior development has focused on basic features, and there has been little discussion on how to support carrier aggregation (CA), transmission mode 10 (TM10), unlicensed component carriers, 64 quadrature amplitude modulation (QAM), turning a small cell on or off, etc. Currently, the following advanced receiver types are considered: symbol level interference cancellation (SLIC); reduced complexity maximum likelihood receiver (R-ML); enhanced minimum mean square error receiver cancellation (E-MMSE-IRC); and codeword level interference cancellation (CWIC).

With respect to signaling, three types of signaling methods have been contemplated. In a first method, known as semi-static signaling, a serving cell will signal semi-static information to its users that have NAICS capability. The semi-static information will include information corresponding to an interfering cell. In a second method, which uses dynamic signaling from a serving cell, the serving cell directly signals information of an interfering cell to users having NAICS capability. Such information may include a modulation order, precoding matrix, resource block (RB) assignments, etc. of the interfering cell. In a third method, dynamic signaling is sent from the interfering cell, wherein the interfering cell signals users of the victim cell with information regarding the interference conditions.

SUMMARY

In an aspect of the disclosure, a method, a computer program product, and an apparatus are provided. The apparatus may be a wireless communication user equipment. The apparatus receives interference cancellation information from a base station. The apparatus receives a transmission through each component carrier of a plurality of component carriers. The apparatus determines for each component carrier at least one of whether to perform interference suppression on the transmission or how to perform the interference suppression on the transmission based on a configuration associated with the component carrier and the interference suppression information. The apparatus can make the determination by determining whether the apparatus has processing resources to allocate to perform interference suppression on the particular component carrier. This can be based on various bases such as prior processing resources allocated to perform interference suppression, a number of component carriers in the a plurality of component carriers, or a priority associated with the particular component carrier, and by allocating processing resources to perform interference suppression on the particular component carrier when the apparatus has resources to allocate to perform interference suppression on the particular component carrier.

In an aspect of the disclosure, a method, a computer program product, and an apparatus are provided. The apparatus may be user equipment that receives information corresponding to a discovery reference signal (DRS) of a small cell, and may perform blind detection based on the received information. The information may correspond to a configuration of the DRS, which may identify a subframe location of the DRS, or other DRS properties. The apparatus may receive a DRS as a signal from a small cell, and may perform interference suppression on the DRS.

In an aspect of the disclosure, a method, a computer program product, and an apparatus are provided. The apparatus may be a user equipment that receives a signal from a serving base station or from an interfering base station. The apparatus performs interference suppression based on the received signal. The apparatus may limit interference suppression operations when dual connectivity is supported. The apparatus may receive the signal from the serving base station indicating whether the interfering base station transmits using 256 quadrature amplitude modulation (QAM). The apparatus may perform blind detection when the interfering base station transmits 256-QAM to detect a Physical downlink Control Channel (PDCCH). The PDCCH may identify transmission parameters of the interfering base station. The apparatus may decode the PDCCH to determine a DL assignment schedule to enable the apparatus to perform codeword level interference cancellation (CWIC).

In an aspect of the disclosure, a method, a computer program product, and an apparatus are provided. The apparatus may be a wireless communication user equipment. The apparatus receives a configuration with carrier aggregation. The apparatus determines a starting symbol for a PDSCH without assistance of a physical control format indicator channel (PCFICH).

In an aspect of the disclosure, a method, a computer program product, and an apparatus are provided. The computer program product may be stored on a computer-readable medium and may include code that when executed on at least one processor causes the at least one processor to receive interference suppression information from a base station, to receive a transmission through each component carrier of a plurality of component carriers, and to determine for each component carrier at least one of whether to perform interference suppression on the transmission or how to perform the interference suppression on the transmission based on a configuration associated with the component carrier and the interference suppression information.

In an aspect of the disclosure, a method, a computer program product, and an apparatus are provided. The computer program product may be stored on a computer-readable medium and may include code that when executed on at least one processor causes the at least one processor to receive a configuration with carrier aggregation, and to determine a starting symbol for a physical downlink shared channel (PDSCH) without assistance of a physical control format indicator channel (PCFICH).

DETAILED DESCRIPTION

Figure 1:
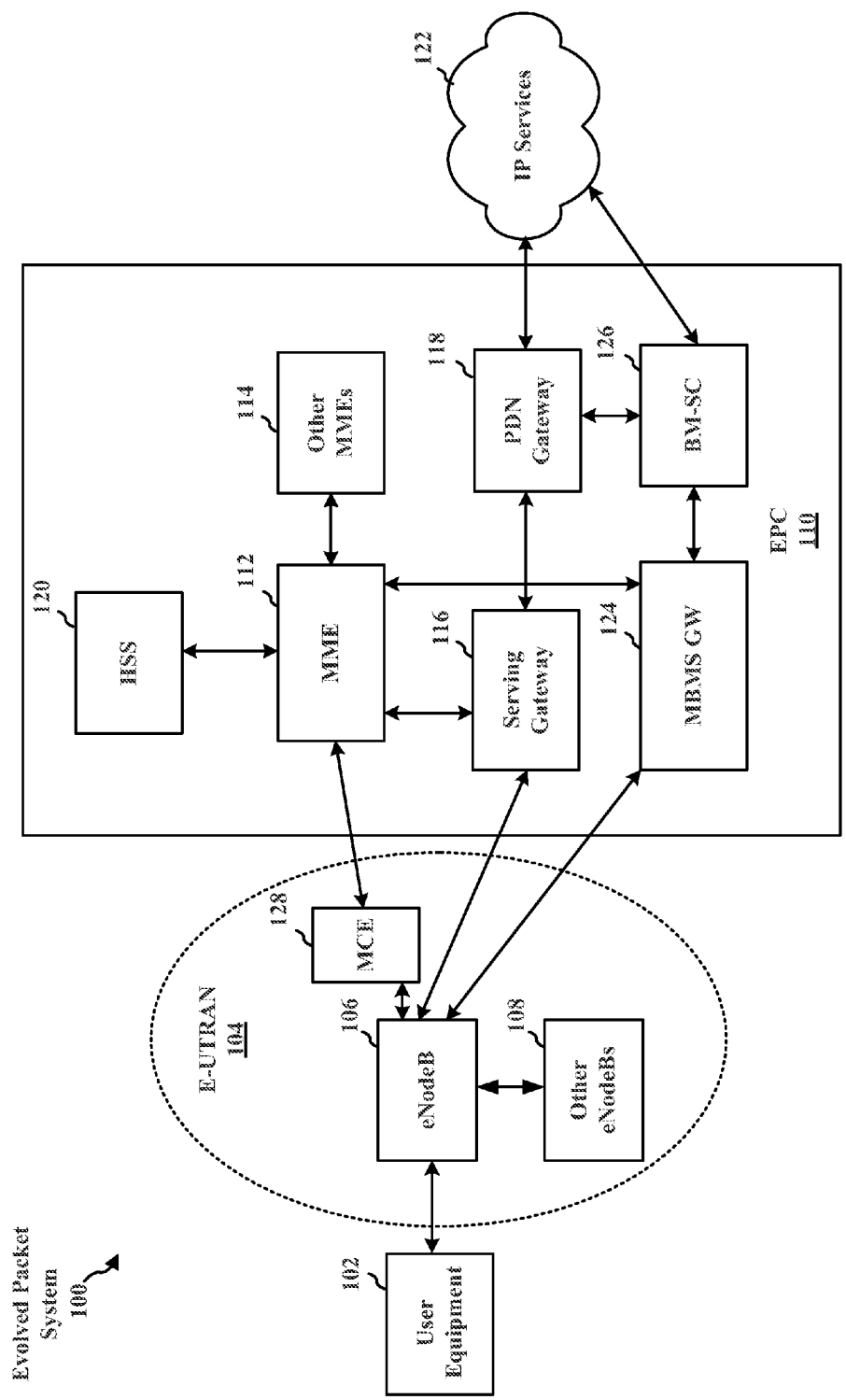
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
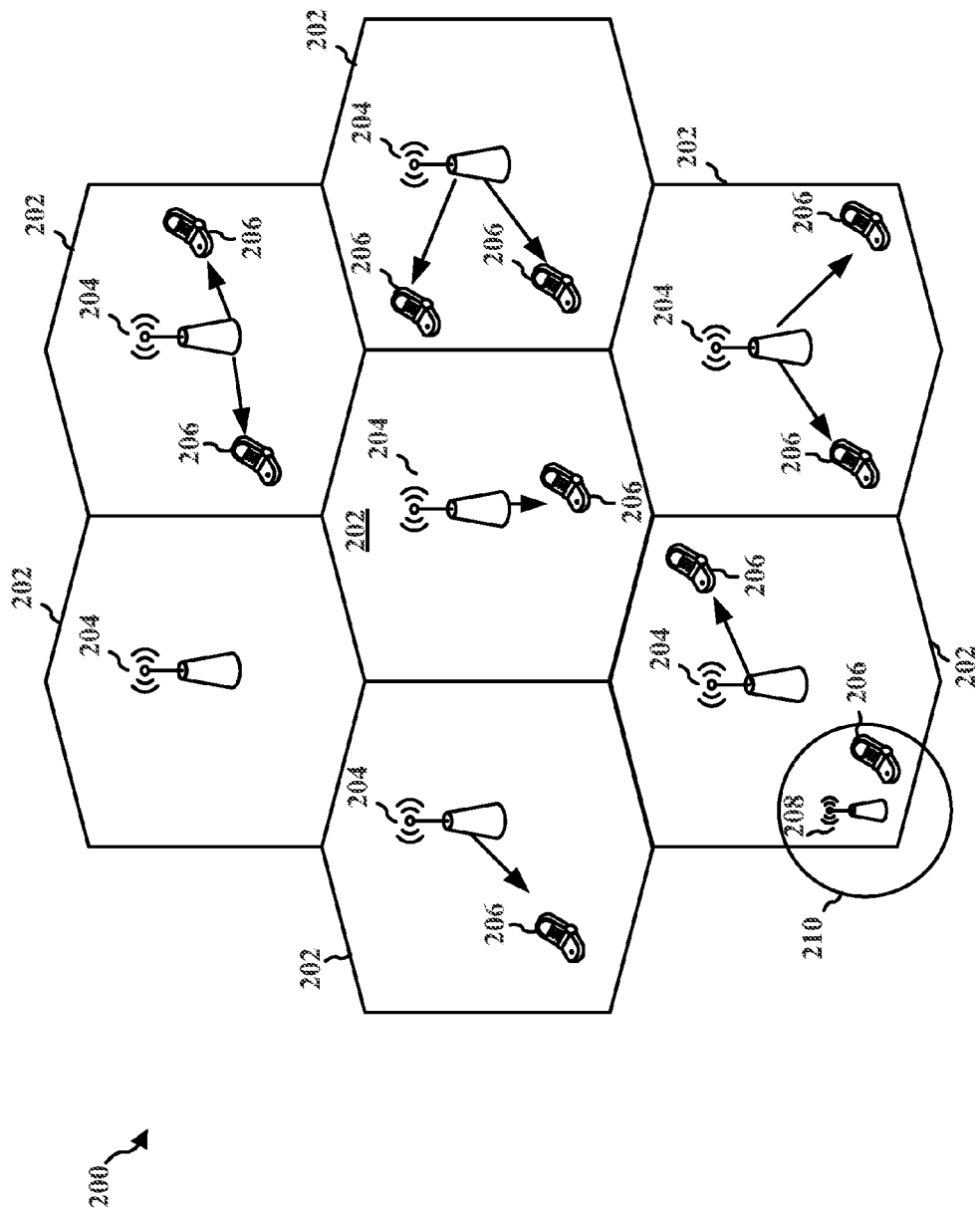
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all of the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
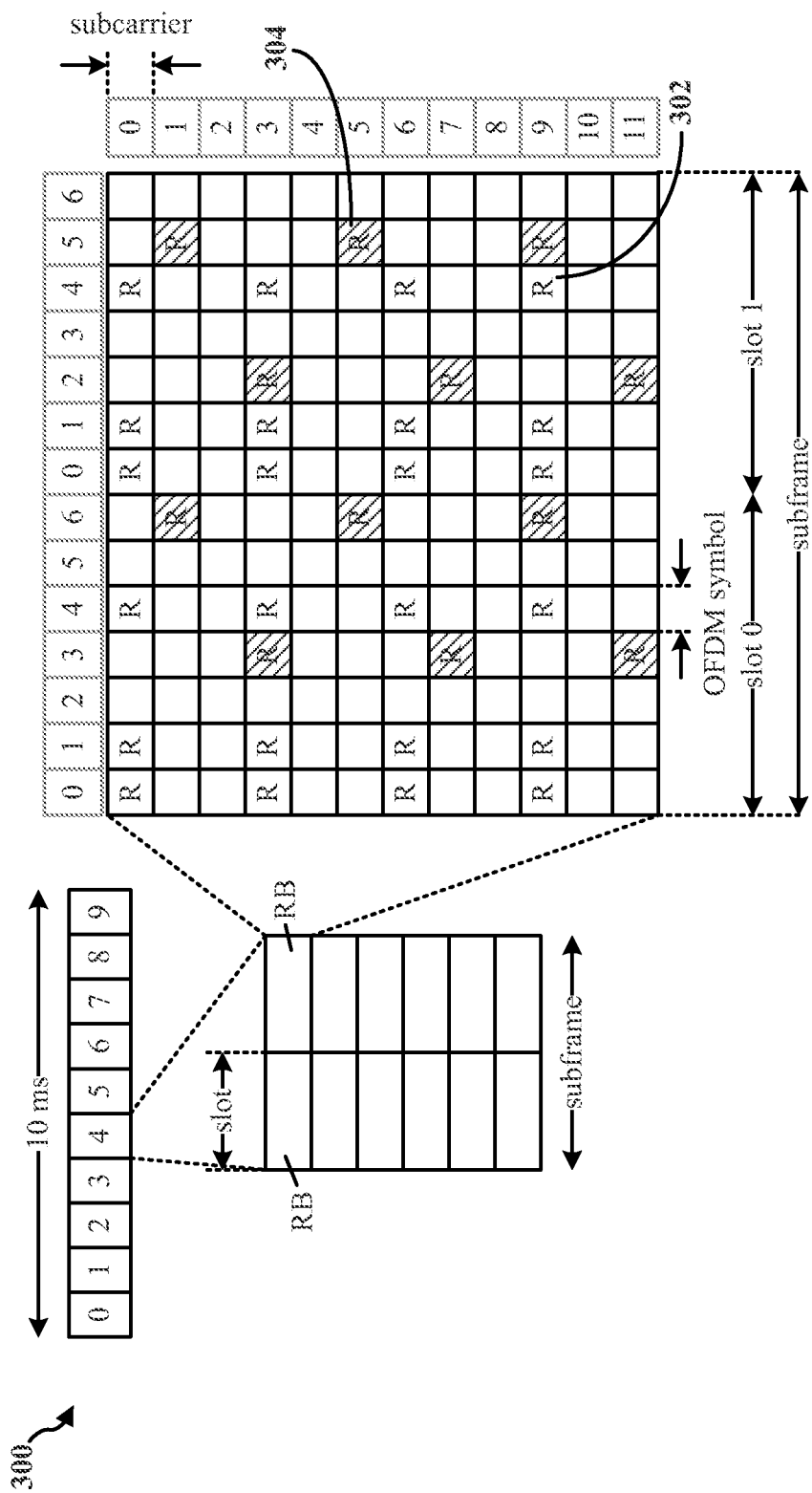
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
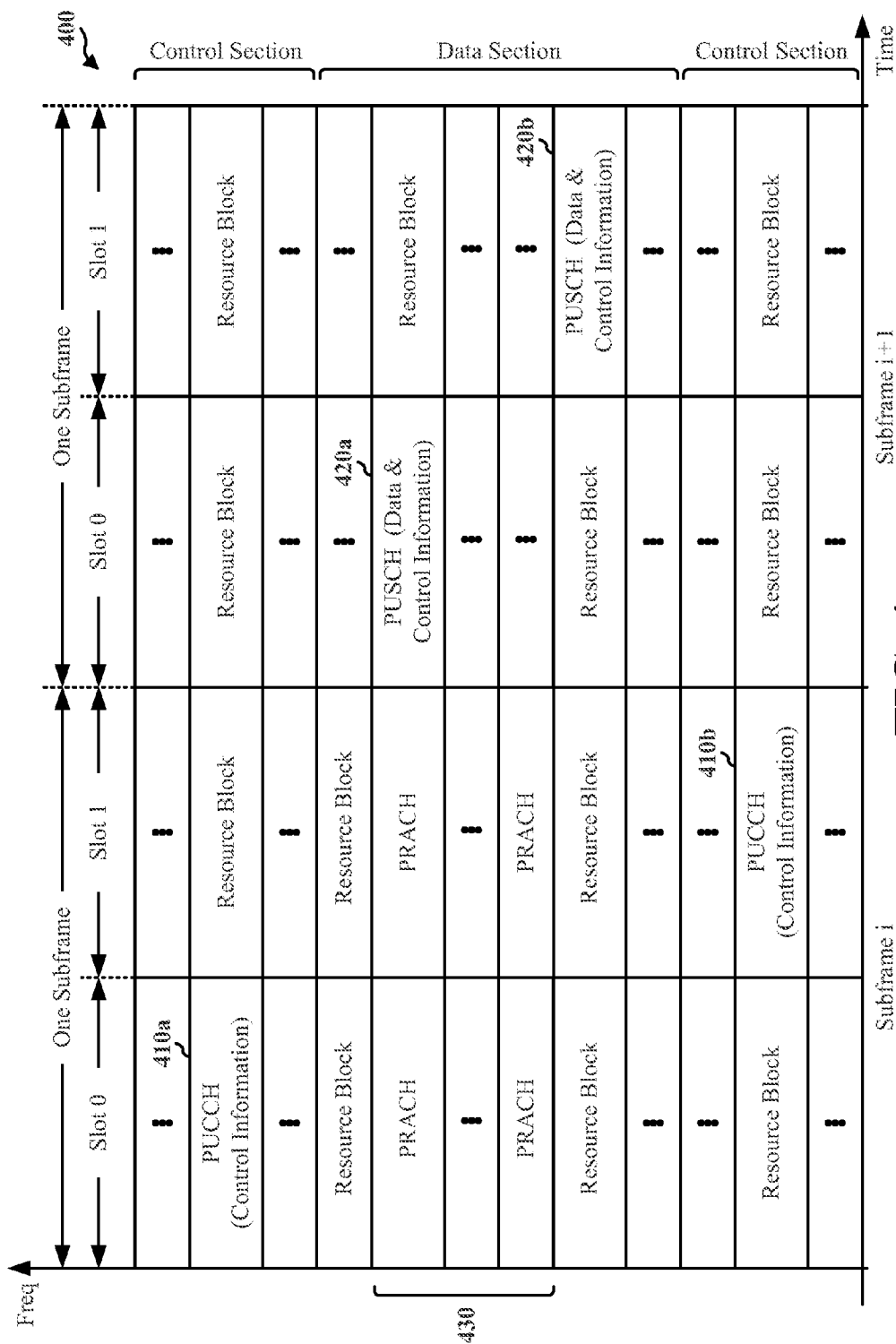
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
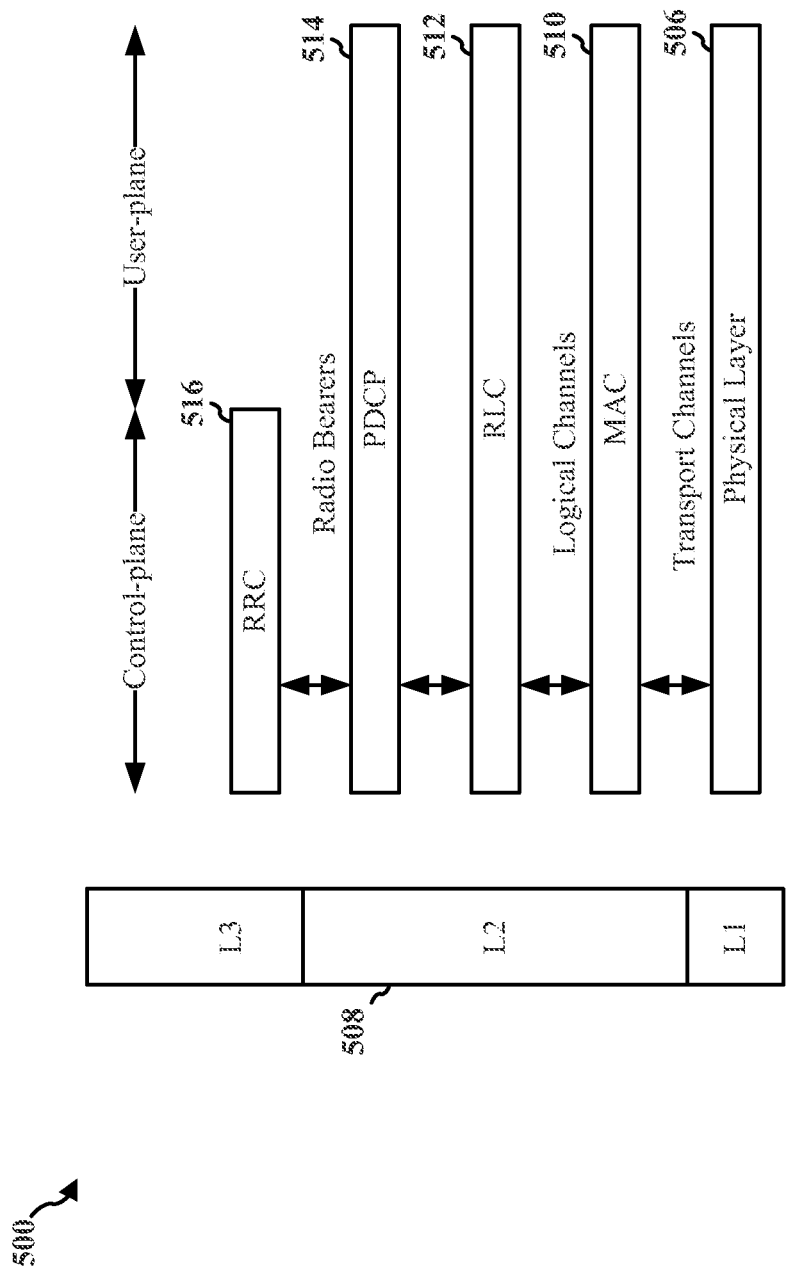
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
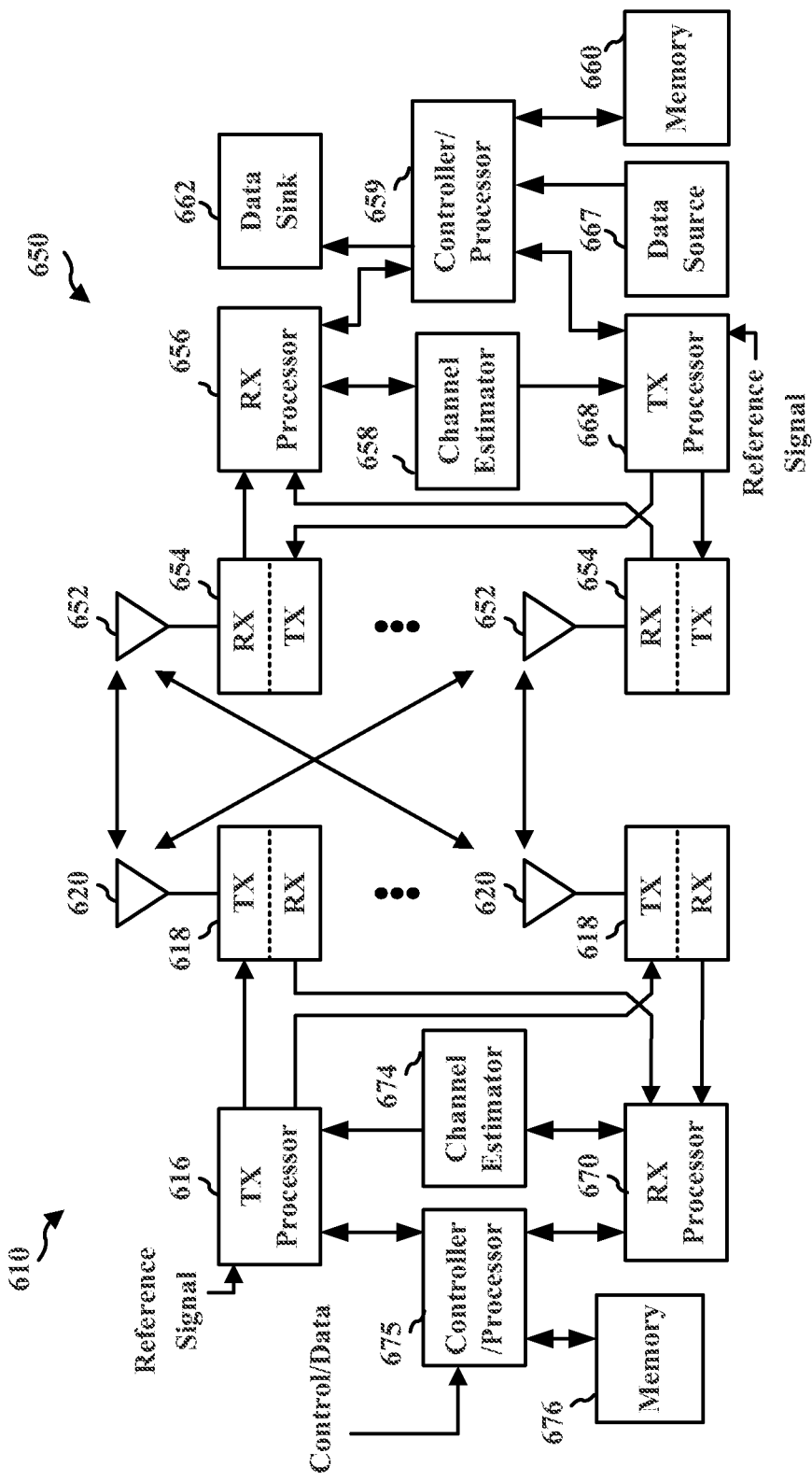
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all of the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
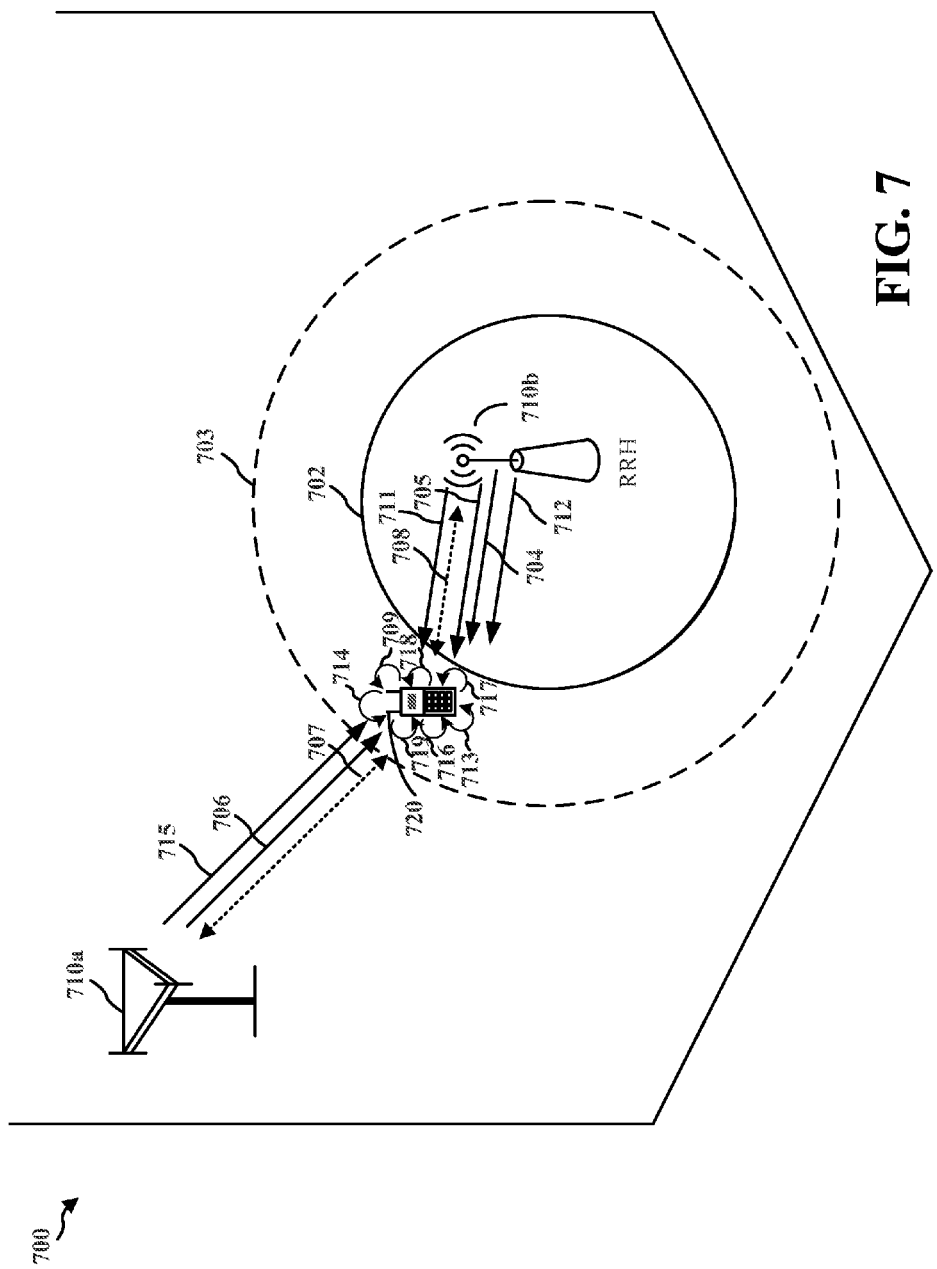
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination (eICIC) between the RRH 710b and the macro eNB 710a and through interference suppression/cancellation performed by the UE 720. In eICIC, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Exemplary aspects described below address advanced features as they correspond to NAICS. For example, exemplary aspects describe how to perform NAICS with advanced receivers, how to handle when a small cell is either on or off as indicated with an associated discovery reference signal (DRS), how to perform NAICS while handling CA and eICIC, how to perform NAICS while handling TM10, and how to perform blind detection of a starting position, or starting symbol, for PDSCH in TM10/CA.

NAICS Capability Handling with CA

A first exemplary aspect focuses on handling different aggregated carriers, or component carriers (CCs), each of which may have a bandwidth of 1.4, 3, 5, 10, 15 or 20 MHz, while a maximum of five component carriers can be aggregated per UE, thereby increasing bandwidth when compared to that of transmissions using a single CC. When NAICS is supported along with other advanced features (such as CA and eICIC), constraints may be imposed due to processing capability of a user (e.g., the UE 720).

The current standard allows eICIC only for a primary cell (Pcell) (the Pcell being served by the primary component carrier and being used to handle the RRC connection), thereby allowing PDSCH interference management through time-division multiplexing (TDM) partitioning, while for a secondary cell (Scell) (the Scell being served by the remaining secondary component carrier(s)), the current standard allows NAICS. With eICIC (e.g., in the Pcell), the interference is typically scheduled in a subframe that is different than that of the serving signal. Accordingly, there might not be any need to cancel the interference on the Pcell corresponding to the primary CC. However, interference on the Scell, in which eICIC is not implemented, may still need to be cancelled or suppressed. Accordingly, when the features of NAICS, CA, and eICIC are all present, the features may be partitioned such that the Pcell is configured to do eICIC, while the Scell is configured to employ NAICS.

A second exemplary aspect focuses on different CCs having different MIMO antenna configurations. For example, one CC may correspond to two antennas (e.g., two TX antennas, or two-by-two (2×2) operation), while another CC corresponds to four antennas (e.g., four TX antennas, or four-by-four (4×4)). In the present aspect, the NAICS may be prioritized on the CC corresponding to two antennas over the CC corresponding to four antennas. That is, NAICS may prioritize interference cancellation/interference suppression on the CC corresponding to the less complicated antenna configuration. Accordingly, and for example, the system may perform NAICS on two CCs having a 2×2 configuration instead of performing NAICS on one CC having a 4×4 configuration. This limitation is based on complexity and processing resources for performing interference cancellation and suppression.

A third exemplary aspect focuses on different CCs utilizing different transmission modes. For example, one CC may use a more traditional transmission mode, such as a CRS-based transmission mode (e.g., TM2 through TM8), while another CC uses a UE-specific reference signal (UE-RS) transmission mode (e.g., more recently implemented transmission modes, such as TM9 and TM10). As another example, the CCs may use the same transmission mode, while one CC may use a demodulation reference signal (DMRS)-based transmission scheme, and while another CC uses a CRS-based transmission scheme with space-frequency block coding (SFBC). Accordingly, by providing different treatment of the CCs, NAICS can be performed on the CC in a manner that improves performance. In this case, the NAICS implementation may prioritize interference cancellation to certain transmission modes (e.g., CRS-based) over other transmission modes (e.g. DM-RS or UE-RS based). Further, the UE 720 may determine whether to perform the interference suppression at all, or may determine what type of interference suppression to perform, based on whether the particular CC uses a CRS-based transmission scheme or a DMRS based transmission scheme.

A fourth exemplary aspect focuses on different CCs using different services. For example, one CC may deploy MBMS messages, while another CC may deploy only unicast messages. For example, one CC may deploy low cost machine type communication (MTC), while another CC deploys regular traffic. In these two examples, NAICS may be prioritized to be performed only on the CC deploying the unicast messages, or only on the CC deploying regular traffic.

A fifth exemplary aspect focuses on different CCs that are differently licensed. For example, NAICS may be either performed differently on the licensed and unlicensed spectrum CCs according to the status of their license, or performed only on CCs that are licensed. Alternatively, NAICS may be employed on the CCs that are operating on unlicensed frequencies, while another interference reduction scheme is used on the licensed frequencies (e.g., eICICs). As an example, and referring to FIG. 7, the CCs operating on unlicensed frequencies may correspond to communications of the UE 720 with the RRH 710*b*, and the CCs operating on licensed frequencies may correspond to communications of the UE 720 with the macro eNB 710*a*.

A sixth exemplary aspect focuses on how the UE 720 signals its capability to perform NAICS to the network (e.g., by communicating with the RRH 710*b*). For example, the UE 720 may signal the number of CCs on which the UE 720 can support NAICS to the RRH 710*b*. Furthermore, the UE 720 may signal its NAICS capability to the network for each combination of CCs (e.g., whether single carrier, or whether CA is used for 2, 3, 4, or 5 CCs). Accordingly, and for example, because the UE's capability to perform NAICS will depend upon carrier aggregation, and because the UE 720 might not be able to support NAICS on all CCs, the UE 720 may signal to the network that the UE is able to perform NAICS on 2 CCs for a carrier aggregation having a combination of 4 CCs, or that the UE 720 is unable to perform NAICS on any of the CCs for a carrier aggregation having a combination of 5 CCs. The UE 720 may also signal to the network a total number of aggregate resource blocks across all of the aggregated CCs on which the UE 720 is able to perform NAICS.

Upon receiving the signaling indicating the UE's capabilities regarding NAICS, the network in the present aspect may take one of two actions. As a first option, the network may provide information (e.g., interference suppression information) to assist the UE 720 with the performance of NAICS on all of the CCs with which the UE 720 is configured. In a manner similar to the third aspect mentioned above, the information provided by the network to the UE 720 allows different treatment of the CCs, thereby enabling NAICS to be performed on different CCs in a manner that improves performance. By receiving the aforementioned signaling regarding NAICS capability from the UE 720, the network is able to estimate the UE's potential performance, and may allow the UE 720 to autonomously determine on which CCs to perform NAICS. As a second option, the network may instead prioritize the CCs on which NAICS is to be performed on behalf of the UE 720. For example, the network may make a determination as to which CCs on which the UE 720 can perform NAICS are most valuable, and thereafter configures information regarding NAICS assistance according the value of each CC.

Additionally, the UE 720 or the network may determine whether the UE 720 has available processing resources to perform NAICS with respect to a particular CC based on processing resources previously allocated to the UE 720 to perform NAICS, based on a number of CCs in the aggregated plurality of component carriers, and/or based on how the CCs are prioritized. Thereafter, the UE 720 or the network may allocate processing resources to perform NAICS on the particular CC when the UE 720 has available resources.

NAICS Signaling with Small Cell DRS

Other example aspects may be directed to small cell discovery reference signaling. A small cell may be a relatively low-powered radio access node having a range of up to 1 or 2 kilometers, and is referred to as "small" due to a comparison of its range to that of a macrocell, which may have a range of dozens of kilometers. A small cell may correspond to a femto cell, a pico cell, a micro cell, or an RRH (e.g., RRH 710*b*).

For example, according to small cell technology, discovery reference signals (DRS) are transmitted (e.g., DRS transmitted 704 by RRH 710*b*) periodically within the cell (e.g., cellular region 702). DRS may be signaled when the cell is on, when the cell is off, or when the cell turns on or turns off based on the designated configuration. The DRS 704 introduced for a small cell may be different than previously introduced DRS for other cell types. Accordingly, the new DRS 704 may require special signaling or implementation handling from advanced receivers (e.g., UE 720).

For example, the UE 720 may receive one or more signals 705 indicating the subframe in which the DRS 704 will be transmitted, or indicating a configuration of the DRS 704 (such as, for example, periodicity, bandwidth, offset, bursty duration, set of CSI-RS configuration, etc.). Once the UE 720 receives the signal 705, the UE 720 can determine how to handle blind detection. That is, the UE 720 may receive signaling associated with one or more neighbor cells, which may be provided a set of potential configurations. Upon receiving the signaling, the UE 720 can determine to use blind detection to determine which signal from the one or more neighbor cells is creating interference. Furthermore, the UE 720 can be signaled regardless of NAICS operation. That is, even if the UE 720 will not perform interference suppression to cancel the DRS signal 704, it can receive DRS information associated with a neighbor cell to assist the UE 720 in searching for the DRS signal 704 from the neighbor cell.

With respect to the present exemplary aspects, in a first option, a single default reference signal configuration may be used for DRS signaling, where the DRS is transmitted regardless of whether the RRH 710*b* is on or off. However, in a manner similar to positioning reference signals (PRS), there may be no need to perform new rate matching by scheduling a PDSCH. That is, rate matching is conventionally performed when properties of a signal are known to the UE (e.g., rate matching is performed with respect to a primary synchronization signal or a secondary synchronization signal). However, if the signal properties are unknown (e.g., the DRS from a neighbor cell may be unknown), or if the signal has a sparse density, rate matching may be difficult, making use of a single default reference signal configuration a more attractive option. In a second option, there may be different treatment according to whether the small cell/cellular region 702 is turned on or off. For example, if the small cell/cellular region 702 is turned on, the UE 720 can cancel all of the signals from the cell 702. However, if the small cell/cellular region 702 is turned off, the UE 720 may cancel only the remaining signal from the cell 702 (e.g., the DRS from the 702, which is transmitted to enable devices to locate the cell 702). Furthermore, the CSI-RS may be transmitted only when the RRH 710*b* switches to an off state.

According to another exemplary aspect, the network serving the UE 720 may assist in the blind detection. For example, a base station (e.g., the RRH 710*b*) of the network may transmit a signal 705 to the UE 720 to inform the UE 720 of a DRS configuration or aspects thereof (e.g., a periodicity of the DRS) of one or more neighboring cells (e.g., member cells). Once the UE 720 is made aware of the DRS of the member cells, the UE 720 may perform blind detection of the DRS for advanced receiver operation, and for deciding which DRS is being transmitted.

According to another exemplary aspect, NAICS operation may be performed differently based on whether the small cell (e.g., the RRH 710*b*) is on or off. For example, the DRS may be transmitted 704 only when the RRH 710*b* is off. Alternatively, the DRS may be transmitted whether the RRH 710*b* is on or off, although there may be different NAICS treatment depending on whether the RRH 710*b* is on or off.

NAICS Signaling with Dual Connectivity and 256-QAM

Other exemplary aspects provide methods for handling 256 quadrature amplitude modulation (QAM), or for handling dual connectivity, using an advanced receiver, and performing NAICS operation according to these features.

For example, separate signaling may be used for 256-QAM. In this aspect, a serving base station (e.g., the macro eNB 710*a* or the RRH 710*b*) communicates to the UE 720 whether the interfering cell (e.g., cellular region 702) supports 256-QAM. If the UE 720 is informed that the interfering cell supports 256-QAM, the UE 720 may thereafter perform additional blind detection. By performing additional blind detection, the UE 720 can determine whether transmissions are based on 256-QAM, or are based on lower modulation. For example, if the UE 720 uses CWIC then the UE 720 can additionally detect the Physical downlink Control Channel (PDDCH) to thereby identify transmission parameters of the interfering cell 702. That is, the UE 720 decodes the PDCCH to determine a DL assignment schedule to enable the UE 720 to perform CWIC. However, to reliably perform CWIC in this manner, the UE 720 must also determine whether MCS in the PDCCH corresponds to, for example, 64-QAM or 256-QAM, due to the fact that a common signaling that maps to different tables (depending on the level of QAM used) can be reused for, for example, 64-QAM or 256-QAM. That is, if the cell employs 256-QAM, the MCS table mapping may be different than if the cell employs 64-QAM. Accordingly, if the cell does not support 256-QAM, then the UE 720 may detect, for example, 64-QAM.

Furthermore, NAICS operation may be limited when dual connectivity is supported, in which the UE is communicating with one base station using one CC (e.g., communicating 707 with macro eNB 710*a* using a first frequency), while the UE is communicating with another base station using another CC (e.g., communicating 708 with RRH 710*b* using a second frequency). For example, when the cell allows 256-QAM, and when the UE 720 conducts dual connectivity, the increased complexity may require a significant share of the UE's resources, thereby causing the UE 720 to have insufficient processing to handle NAICS, or causing the UE to only have enough resources to support limited NAICS functionality (e.g., wherein interference from only one cell is cancelled, while interference from other cells is not).

Starting Position for PDSCH in TM10/CA

Figure 8:
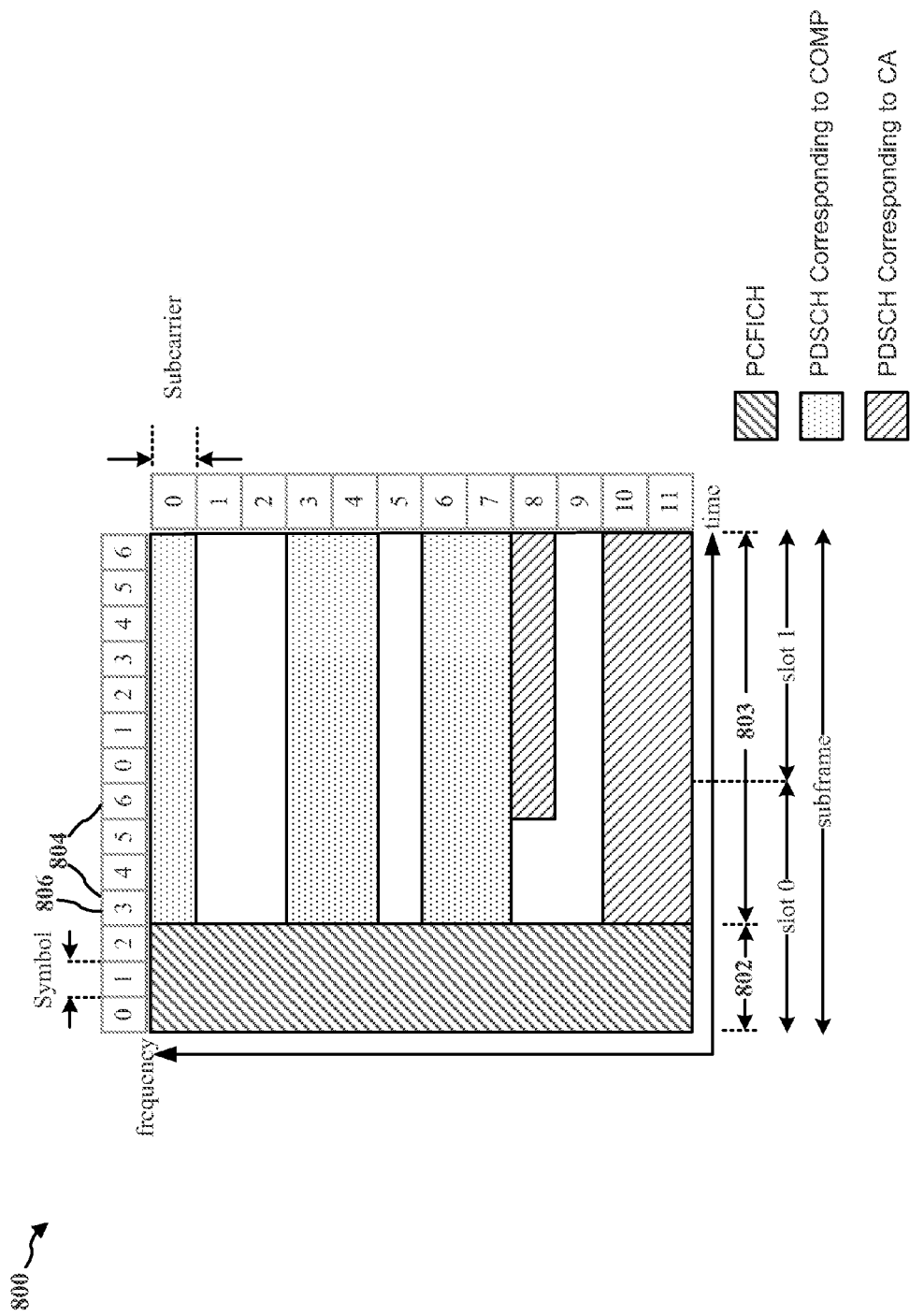
FIG. 8 is a diagram illustrating a transmission comprising a control region (PCFICH) and a data region (PDSCH).

FIG. 8 is a diagram 800 illustrating a transmission comprising a control region 802, including a PCFICH, and a data region (PDSCH) 803. Referring to FIGS. 7 and 8, other aspects of the present disclosure provide methods for determining a symbol representing a starting position/starting symbol 804, 806 for PDSCH 803 in TM10 implementation or CA implementation. Unlike many other scenarios, TM10 and CA implementation with cross-carrier scheduling do not have the starting symbol 804, 806 for PDSCH 803 signaled by PCFICH 802. The PCFICH is a control channel that identifies whether the control region occupies 1, 2, or 3 symbols (e.g., symbols 0, 1, and/or 2 of slot 0) depending on the spectrum size. That is, the PCFICH itself may be transmitted on a first symbol (e.g., symbol 0) while PCFICH content indicates a control region size between 1 to 3 symbols. However, for TM10, a starting symbol 804 may be configured by an RRC signal, in which case a starting symbol 804 may need to be blindly detected for purposes of interference cancellation or suppression.

In a first option of the present aspects, the UE 720 may conduct full blind detection. In full blind detection, the UE 720 does not have knowledge of the scheduled users, and may perform blind detection of the PDSCH 803 starting symbols 804, 806 on an RB-by-RB basis (e.g., the UE 720 may conduct energy detection in the first symbol following the PCFICH indicated control region 802 where there is a potential ambiguity with respect to starting symbols 804, 806 of the scheduled users). Accordingly, the same starting symbol 804, 806 is restricted by the macro eNB 710*a* for all TM10 and CA UEs, and this restriction may be conveyed in a transmission from the eNB 710*a* to the UE 720.

In a second option of the present aspects, the UE 720 may assume that the starting symbol 806 is at a same symbol following the PCFICH indicated control region 802, such as symbol 3 of slot 0, as there will be no signaling following the PCFICH, and as there might be no signaling agreement between the UE 720 and the eNB 710*a*. Furthermore or alternatively, PDSCH IC may always start from symbol 3 (e.g., starting symbol 806), in which case no blind detection or signaling will be necessary.

In a third option of the present aspects, the UE 720 may choose to perform blind detection only if interference is high. Because there may be no signaling agreement between the UE 720 and the eNB 710*a*, and because the eNB might not follow the PCFICH, the UE 720 may assume that the PCFICH is correct unless a relatively high level of interference is detected. By performing blind detection immediately following the PCFICH, the UE 720 will save power otherwise spent searching for the starting symbol 804, 806. However, when interference is relatively high, the UE 720 can perform blind detection to confirm that the starting symbol 804, 806 immediately follows the PCFICH. That is, the UE 720 may assume that the starting symbol 804, 806 is at symbol 3, but if the UE 720 determines that the interference at symbol 3 is above a particular level (e.g., if a parameter corresponding to blind detection implies that there is a high dominant interferer present in an RB of symbol 3), then the UE 720 may conduct blind detection to determine whether symbol 2 has data corresponding to the PDSCH 803, and is therefore the starting symbol 804, 806. Similarly, the UE 720 may thereafter determine that symbol 1 is the starting symbol 804, 806 if an interference level at symbol 2 is determined to be too high, thereby indicating that symbol 2 is not the starting symbol 804, 806.

It should be noted that in performing blind detection of the starting symbol 804, 806 for PDSCH 803 in TM10/CA, different signaling may be used. For example, in a first option, all new UEs may use the same starting symbol 804, 806. That is, all TM10/CA users (e.g., UE 720) may be signaled with a same starting symbol 804, 806. When conducting blind detection of the starting symbol 804, 806, the UE 720 may check only two starting symbols 804, 806, a first starting symbol 804 corresponding to a starting symbol of a new UE, and a second starting symbol 806 particular by the PCFICH 802.

In a second option, all of the users (e.g., UE 720) may use the same starting symbol 804, 806. The PCFICH 802 may be semi-statically changed, and the signaling may be used to align all users with a same control region as PCFICH 802 (e.g., both legacy UEs and TM10/CA UEs). As a further example, the signaling can rely on ePDCCH and align RRC signaled and PCFICH to a single control symbol in the control region (e.g., PCFICH 802) without relying on cross carrier scheduling.

In a third option, different treatment with respect to starting symbol/starting position signaling may be particular for UEs depending on whether they use CA or coordinated multi-point (CoMP) transmission. For example, the starting symbols 806 may be dynamic point selection (DPS) for CoMP, while the starting symbols 804 may be HetNet for CA. This is because interference is typically relatively stronger for HetNet, and the UE 720 can ensure that the correct starting symbol 804, 806 is selected by performing blind detection. For DPS, however, the serving cell is dynamically changing, and the UE 720 can perform independent processing for each subframe to determine the starting symbol 804, 806. Further, in a CoMP transmission, the starting symbol 806 may always follow PCFICH 802, while in a CA transmission, the starting symbol 804 may be indicated by the RC signal, and may use the RC signal in accordance with the first and second options directly above.

Figure 9:
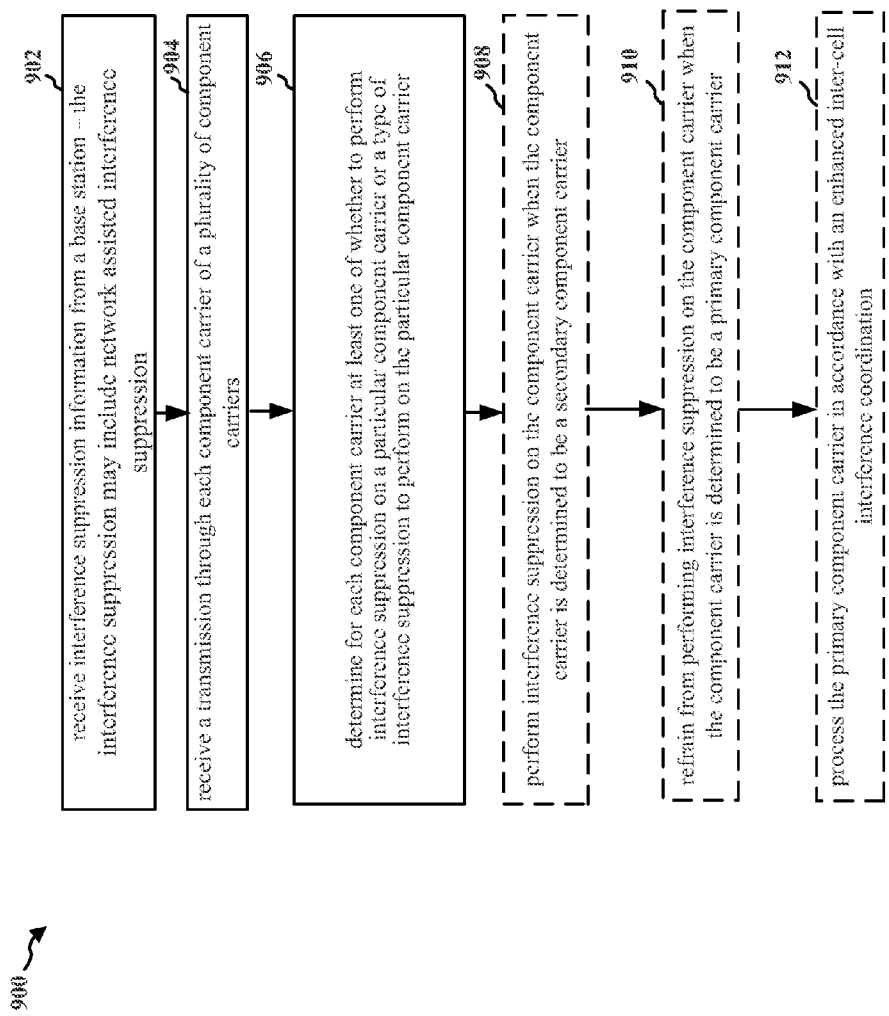
FIG. 9 is a flow chart of a method of wireless communication.

FIG. 9 is a flow chart 900 of a method of wireless communication. The method may be performed by a UE, such as the UE 720 shown in FIG. 7.

At 902, the UE receives interference cancellation information from a base station. The interference cancellation may include NAICS. For example, referring to FIG. 7, the UE 720 may receive interference cancellation information (e.g., transmissions 706, 712), which may include NAICS, from a base station (e.g., macro eNB 710*a* or RRH 710*b*).

At 904, the UE receives a transmission through each component carrier of a plurality of component carriers. For example, referring to FIG. 7, the UE 720 may receive a transmission (e.g., transmissions 707 and/or 708) through each component carrier of a plurality of component carriers.

At 906, the UE determines for each component carrier at least one of whether to perform interference suppression on a particular component carrier or a type of interference suppression to perform on the particular component carrier based on a configuration associated with the particular component carrier and the interference suppression information. The UE may make the determination by determining whether the UE has processing resources to allocate to perform interference suppression on the particular component carrier based on at least one of prior processing resources allocated to perform interference suppression, a number of component carriers in the a plurality of component carriers, or a priority associated with the particular component carrier, and by allocating processing resources to perform interference suppression on the particular component carrier when the UE has resources to allocate to perform interference suppression on the particular component carrier. The UE may determine whether the particular component carrier uses a cell-specific reference signal (CRS) based transmission scheme or a demodulation reference signal (DMRS) based transmission scheme, and may determine whether to perform the interference suppression or a type of interference suppression to perform based on whether the particular component carrier uses a CRS-based transmission scheme or a DMRS based transmission scheme. The UE may determine, based on the transmission mode of the particular component carrier, at least one of whether to perform the interference suppression, or a type of interference suppression to perform. The interference suppression information may include the priority associated with the particular component carrier. For example, referring to FIG. 7, the UE 720 may determine 709 for each component carrier at least one of whether to perform 713 interference suppression on a particular component carrier (e.g., a component carrier corresponding to transmissions 707 and/or 708) or a type of interference suppression to perform 713 on the particular component carrier based on a configuration associated with the component carrier and the interference suppression information, by determining 709 whether the UE 720 has processing resources to allocate to perform 713 interference suppression on the particular component carrier based on at least one of prior processing resources allocated to perform interference suppression, a number of component carriers in the a plurality of component carriers, or a priority associated with the particular component carrier, and by allocating 719 processing resources to perform interference suppression on the particular component carrier when the UE 720 has resources to allocate 719 to perform interference suppression on the particular component carrier. The UE 720 may determine 709 whether the particular component carrier uses a cell-specific reference signal (CRS) based transmission scheme or a demodulation reference signal (DMRS) based transmission scheme, and may determine 709 whether to perform the interference suppression or a type of interference suppression to perform based on whether the particular component carrier uses a CRS-based transmission scheme or a DMRS based transmission scheme. The UE may determine 709, based on the transmission mode of the particular component carrier, at least one of whether to perform the interference suppression, or a type of interference suppression to perform.

In one configuration, the UE determines an antenna configuration associated with the component carrier. The UE may determine whether to perform the interference cancellation or how to perform the interference cancellation based on the determined antenna configuration. For example, referring to FIG. 7, the UE 720 may determine 709 an antenna configuration associated with the component carrier, and may determine 709 whether to perform 713 the interference cancellation or how to perform 713 the interference cancellation based on the determined antenna configuration In one configuration, the UE determines whether the component carrier uses a CRS-based transmission mode (TM) or a UE-RS based TM. The UE may determine whether to perform the interference cancellation or how to perform the interference cancellation based on whether the component carrier uses a CRS-based TM or a UE-RS based TM. For example, referring to FIG. 7, the UE 720 may determine 709 whether the component carrier uses a CRS-based TM or a UE-RS based TM, and may determine 709 whether to perform 713 the interference cancellation or how to perform 713 the interference cancellation based on whether the component carrier uses a CRS-based TM or a UE-RS based TM In one configuration, the UE determines a type of services provided through the component carrier. The UE may determine whether to perform the interference cancellation or how to perform the interference cancellation based on the determined type of services provided through the component carrier. For example, referring to FIG. 7, the UE 720 may determine 709 a type of services provided through the component carrier, and may determine 709 whether to perform 713 the interference cancellation or how to perform 713 the interference cancellation based on the determined type of services provided through the component carrier.

In one configuration, the UE determines whether the component carrier utilizes licensed spectrum or unlicensed spectrum. The UE may determine whether to perform the interference cancellation or how to perform the interference cancellation based on whether the component carrier utilizes licensed spectrum or unlicensed spectrum. For example, referring to FIG. 7, the UE 720 may determine 709 whether the component carrier utilizes licensed spectrum or unlicensed spectrum, and may determine 709 whether to perform 713 the interference cancellation or how to perform 713 the interference cancellation based on whether the component carrier utilizes licensed spectrum or unlicensed spectrum.

In one configuration, the UE determines whether the component carrier is a primary component carrier or a secondary component carrier. For example, referring to FIG. 7, the UE 720 may determine 709 whether the component carrier is a primary component carrier or a secondary component carrier.

At 908, the UE may also perform interference cancellation on the component carrier when the component carrier is determined to be a secondary component carrier.

At 910, the UE may refrain from performing interference cancellation on the component carrier when the component carrier is determined to be a primary component carrier. The primary component carrier, which is associated with a Pcell, may allow for PDSCH interference management through TDM partitioning. Accordingly, it may be less beneficial, or somewhat redundant, to perform NAICS on the Pcell. By refraining from performing NAICS on the Pcell, the saved power that would otherwise be used can instead be used to perform NAICS on the secondary component carrier associated with the Scell. This may also conserve processing resources of the UE 720.

At 912, the UE may process the primary component carrier in accordance with an eICIC. For example, referring to FIG. 7, the UE 720 may perform 713 interference cancellation on the component carrier when the component carrier is determined to be a secondary component carrier, may refrain from performing 713 interference cancellation on the component carrier when the component carrier is determined to be a primary component carrier, and may process 714 the primary component carrier in accordance with an eICIC.

Figure 10:
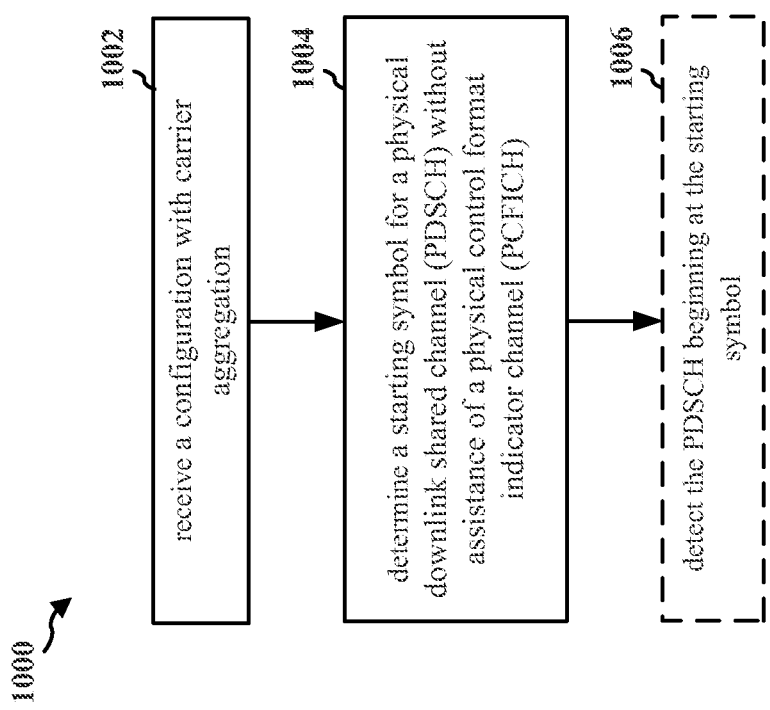
FIG. 10 is a flow chart of a method of wireless communication.

FIG. 10 is a flow chart 1000 of a method of wireless communication. The method may be performed by a UE, such as the UE 720 shown in FIG. 7.

At 1002, the UE receives a configuration with carrier aggregation. For example, referring to FIG. 7, the UE 720 may receive a configuration 711, 715 with carrier aggregation (e.g., from RRH 710b, or from macro eNB 710a).

At 1004, the UE determines a starting symbol for a PDSCH without assistance of a PCFICH. For example, referring to FIGS. 7 and 8, the UE 720 may determine 716 a starting symbol 804, 806 for a PDSCH 803 without assistance of a PCFICH 802. In one configuration, the UE 720 determines 716 the starting symbol 804, 806 for the PDSCH 803 through blind detection. In one configuration, the starting symbol 804, 806 for the PDSCH 803 is assumed 716 to be symbol 3. In one configuration, the UE 720 determines 716 the starting symbol 804, 806 for the PDSCH 803 by assuming 716 the starting symbol 804, 806 for the PDSCH 803 is symbol 3, determining 717 that an interference of the PDSCH 803 is greater than a threshold, and performing 718 blind detection to determine the starting symbol 804, 806 for the PDSCH 803.

At 1006, the UE may detect the PDSCH beginning at the starting symbol. For example, referring to FIGS. 7 and 8, once the UE 720 determines 716 the starting symbol 804, the UE may be able to detect the PDSCH 803 in accordance with the determined starting symbol 804.

Figure 11:
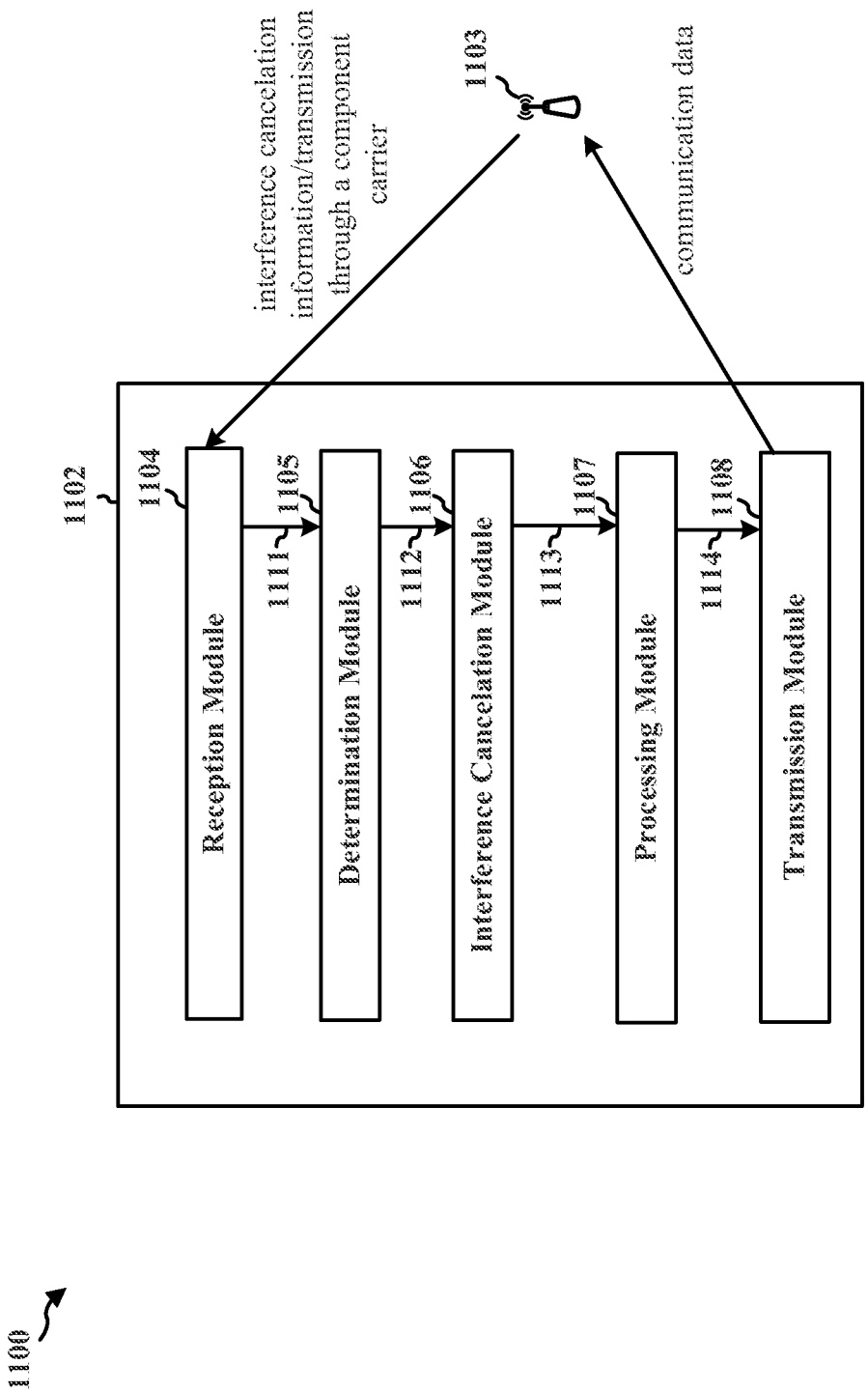
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus 1102 may be a UE, such as UE 720 shown in FIG. 7. The UE 1102 includes a reception module 1104 that is configured to receive interference cancellation information from a base station 1103, is configured to receive a transmission through each component carrier of a plurality of component carriers, and is configured to receive a configuration with carrier aggregation. The UE may receive the data from a macro eNB, such as the macro eNB 710a of FIG. 7, or from an RRH, such as the RRH 710b of FIG. 7.

The UE 1102 further includes a determination module 1105 that is configured to communicate with the reception module 1104, and is configured to determine for each component carrier whether to perform interference suppression on a particular component carrier and/or a type of interference suppression to perform on the particular component carrier based on a configuration associated with the particular component carrier and the interference suppression information. The determination module 1105 is configured to determine whether the UE 1102 has processing resources to allocate to perform interference suppression on the particular component carrier based on at least one of prior processing resources allocated to perform interference suppression, a number of component carriers in the a plurality of component carriers, or a priority associated with the particular component carrier, and is configured to allocate processing resources to perform interference suppression on the particular component carrier when the UE 1102 has resources to allocate to perform interference suppression on the particular component carrier. The determination module 1105 may make its determination based upon data 1111 corresponding to interference cancellation information that is received from the reception module 1104. The determination module 1105 may be configured to determine whether and/or how to perform the interference cancellation based on, for example, a determination of an antenna configuration associated with the component carrier, a determination whether the component carrier uses a CRS-based TM or a UE-RS based TM, a determination of a type of services provided through the component carrier, and/or a determination of whether the component carrier utilizes licensed spectrum or unlicensed spectrum. The determination module 1105 may be configured to determine whether and/or how to perform the interference cancellation based on, for example, whether the component carrier is a primary component carrier or a secondary component carrier, and may also be configured to refrain from performing interference cancellation on the component carrier when the component carrier is determined to be a primary component carrier, and or process the primary component carrier in accordance with an eICIC. The determination module 1105 may be configured to determine whether the particular component carrier uses a CRS-based transmission scheme or a DMRS-based transmission scheme, may be configured to determine whether to perform the interference suppression or a type of interference suppression to perform based on whether the particular component carrier uses a CRS-based transmission scheme or a DMRS based transmission scheme, and may be configured to determine, based on the transmission mode of the particular component carrier, at least one of whether to perform the interference suppression, or a type of interference suppression to perform. The determination module 1105 may also be configured to determine a starting symbol for a PDSCH without assistance of a PCFICH (e.g., through blind detection, by assuming the starting symbol is symbol 3, or by determining that an interference of the PDSCH is greater than a threshold, and performing blind detection to determine the starting symbol for the PDSCH).

The UE 1102 further includes an interference cancellation module 1106 that is configured to communicate with the determination module 1105, and is configured to either perform interference cancellation on the component carrier when the component carrier is determined to be a secondary component carrier, or to refrain from performing interference cancellation on the component carrier when the component carrier is determined to be a primary component carrier. The interference cancellation module 1106 may determine whether to perform interference cancellation based on data 1112 indicating the determination module's determination of whether to perform interference cancellation received from the determination module 1105.

The UE 1102 further includes a processing module 1107 that is configured to communicate with the interference cancellation module 1106, and is configured to process the primary component carrier in accordance with an eICIC. The processing module 1107 may process the primary component carrier in accordance with data 1113 received from the interference cancellation module 1106. The data 1113 may correspond to an interference canceled secondary component carrier, or may correspond to a primary component carrier.

The UE 1102 further includes a transmission module 1108 that communicates with the processing module 1107. The transmission module 1108 may receive data 1114 corresponding to processed primary component carrier from the processing module 1107. The transmission module 1108 is configured to transmit communication data to the base station 1103.

The apparatus 1102 may include additional modules that perform each of the blocks of the algorithms respectively in the aforementioned flow charts of FIGS. 9 and 10. As such, each block in the aforementioned flow charts of FIGS. 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
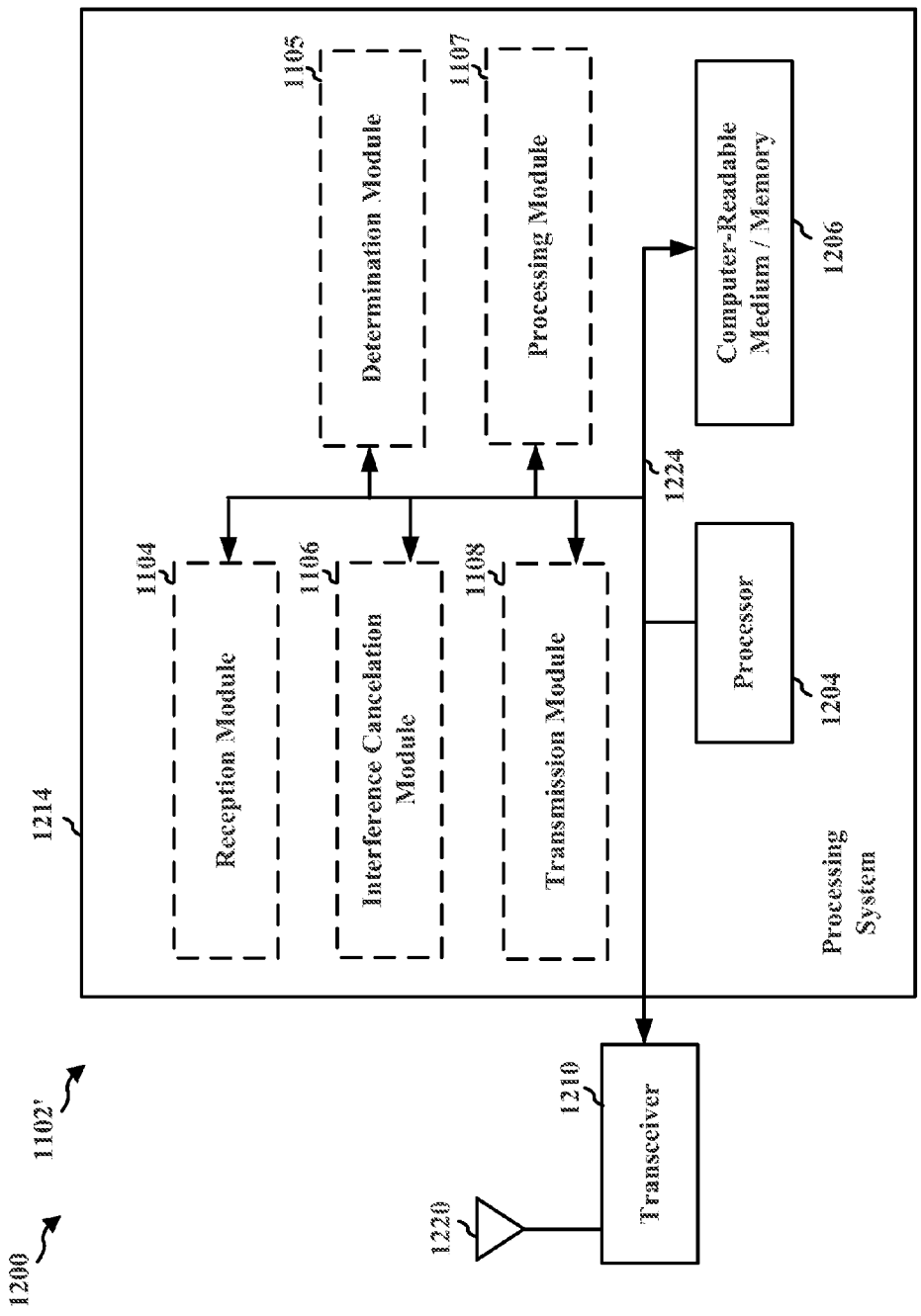
FIG. 12 is a diagram illustrating an example of a hardware implementation for an apparatus employing a processing system.

FIG. 12 is a diagram 1200 illustrating an example of a hardware implementation for a UE 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1105, 1106, 1107, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception module 1104. In addition, the transceiver 1210 receives information from the processing system 1214, specifically the transmission module 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least the determination module 1105, the interference cancellation module 1106, and the processing module 1107. The modules may be software modules running in the processor 1204, resident/stored in the computer readable medium/memory 1206, one or more hardware modules coupled to the processor 1204, or some combination thereof. The processing system 1214 may be a component of the UE 1102, and may include the memory 660 and/or at least one of the TX processor 668, the RX processor 656, and the controller/processor 659.

In one configuration, the UE 1102/1102' for wireless communication is a UE that includes means for receiving interference cancellation information from a base station. The UE further includes means for receiving a transmission through each component carrier of a plurality of component carriers. The UE further includes means for determining for each component carrier at least one of whether to perform interference cancellation on the transmission or how to perform the interference cancellation on the transmission based on a configuration associated with the component carrier and the interference cancellation information. The UE may include means for performing interference cancellation on the component carrier when the component carrier is determined to be a secondary component carrier. The UE may include means for refraining from performing interference cancellation on the component carrier when the component carrier is determined to be a primary component carrier. The UE may include means for processing the primary component carrier in accordance with an eICIC. The aforementioned means may be one or more of the aforementioned modules of the UE 1102 and/or the processing system 1214 of the UE 1102' configured to perform the functions recited by the aforementioned means. As described supra, the processing system 1214 may include the TX processor 668, the RX processor 656, and the controller/processor 659. As such, in one configuration, the aforementioned means may be the TX processor 668, the RX processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving interference suppression information from a base station;
   receiving a transmission through at least one component carrier of a plurality of component carriers; and
   for each component carrier of the at least one component carrier, determining
      whether to perform interference suppression on a particular component carrier, and
      a type of interference suppression to perform on the particular component carrier based on a configuration associated with the particular component carrier and the interference suppression information when it is determined to perform interference suppression on the particular component carrier.

2. The method of claim 1, wherein the determining further comprises
   determining whether the UE has allocated processing resources for performing interference suppression on the particular component carrier based on at least one of:
      prior processing resources allocated to perform interference suppression,
      a number of component carriers in the a plurality of component carriers, or
      a priority associated with the particular component carrier; and performing interference suppression on the particular component carrier when it is determined that the UE has the allocated processing resources.

3. The method of claim 1, wherein the interference suppression information includes a priority associated with the particular component carrier.

4. The method of claim 1, wherein the determining further comprises
determining whether the particular component carrier is a primary component carrier or a secondary component carrier, and
the method further comprises:
performing interference suppression on the particular component carrier when the particular component carrier is determined to be a secondary component carrier.

5. The method of claim 4, further comprising:
refraining from performing interference suppression on the particular component carrier when the particular component carrier is determined to be a primary component carrier; and
processing the primary component carrier in accordance with an enhanced inter-cell interference coordination (eICIC).

6. The method of claim 1, wherein the determining further comprises
determining an antenna configuration associated with the particular component carrier, and
wherein determining whether to perform the interference suppression on the particular component carrier or a type of interference suppression to perform on the particular component carrier is based on the determined antenna configuration.

7. The method of claim 1, wherein the determining further comprises
determining whether the particular component carrier uses a cell-specific reference signal (CRS) based transmission mode (TM) or a UE-specific reference signal (UE-RS) based TM, and
determining whether to perform the interference suppression or a type of interference suppression to perform based on whether the particular component carrier uses a CRS-based TM or a UE-RS based TM.

8. The method of claim 1, wherein the determining further comprises
determining whether the particular component carrier uses a cell-specific reference signal (CRS) based transmission scheme or a demodulation reference signal (DMRS) based transmission scheme, and
determining whether to perform the interference suppression or a type of interference suppression to perform based on whether the particular component carrier uses a CRS-based transmission scheme or a DMRS based transmission scheme.

9. The method of claim 1, wherein the determining further comprises
determining, based on the transmission mode of the particular component carrier, at least one of:
whether to perform the interference suppression; or
a type of interference suppression to perform.

10. The method of claim 1, wherein the determining further comprises
determining a type of services provided through the particular component carrier, and
determining whether to perform the interference suppression or a type of interference suppression to perform based on the determined type of services provided through the particular component carrier.

11. The method of claim 1, wherein the determining further comprises
determining whether the particular component carrier utilizes licensed spectrum or unlicensed spectrum, and
determining whether to perform the interference suppression or a type of interference suppression to perform based on whether the particular component carrier utilizes licensed spectrum or unlicensed spectrum.

12. The method of claim 1, wherein:
a first type of interference suppression comprises network assisted interference cancellation and suppression (NA-ICS) that is associated with at least one first component carrier of the plurality of component carriers, and
a second type of interference suppression comprises enhanced inter-cell interference coordination (eICIC) that is associated with at least one second component carrier of the plurality of component carriers.

13. An apparatus for wireless communication, the apparatus including a user equipment (UE), the apparatus comprising:
means for receiving interference suppression information from a base station;
means for receiving a transmission through at least one component carrier of a plurality of component carriers; and
means for determining for each component carrier of the at least one component carrier
whether to perform interference suppression on a particular component carrier, and
a type of interference suppression to perform on the particular component carrier based on a configuration associated with the particular component carrier and the interference suppression information when it is determined to perform interference suppression on the particular component carrier.

14. The apparatus of claim 13, wherein the means for determining is configured to:
determine whether the UE has allocated processing resources for performing interference suppression on the particular component carrier based on at least one of
prior processing resources allocated to perform interference suppression,
a number of component carriers in the a plurality of component carriers, or
a priority associated with the particular component carrier, wherein the apparatus further comprises
means for performing interference suppression on the particular component carrier when it is determined that the UE has the allocated resources.

15. The apparatus of claim 13, wherein the interference suppression information includes a priority associated with the particular component carrier.

16. The apparatus of claim 13, wherein
the means for determining is configured to determine whether the particular component carrier is a primary component carrier or a secondary component carrier, and
the apparatus further comprises means for performing interference suppression on the particular component carrier when the particular component carrier is determined to be a secondary component carrier.

17. The apparatus of claim 16, further comprising:
means for refraining from performing interference suppression on the particular component carrier when the particular component carrier is determined to be a primary component carrier; and means for processing the primary component carrier in accordance with an enhanced inter-cell interference coordination (eICIC).

18. The apparatus of claim 13, wherein the means for determining is configured to determine an antenna configuration associated with the particular component carrier, and is configured to determine whether to perform the interference suppression or a type of interference suppression to perform based on a determined antenna configuration.

19. The apparatus of claim 13, wherein the means for determining is configured to determine whether the particular component carrier uses a cell-specific reference signal (CRS) based transmission mode (TM) or a UE-specific reference signal (UE-RS) based TM, and is configured to determine whether to perform the interference suppression or a type of interference suppression to perform based on whether the particular component carrier uses a CRS-based TM or a UE-RS based TM.

20. The apparatus of claim 13, wherein the means for determining is configured to determine whether the particular component carrier uses a cell-specific reference signal (CRS) based transmission scheme or a demodulation reference signal (DMRS) based transmission scheme, and is configured to determine whether to perform the interference suppression or a type of interference suppression to perform based on whether the particular component carrier uses a CRS-based transmission scheme or a DMRS based transmission scheme.

21. The apparatus of claim 13, wherein the means for determining is configured to determine, based on the transmission mode of the particular component carrier, at least one of:
whether to perform the interference suppression; or
a type of interference suppression to perform.

22. The apparatus of claim 13, wherein the means for determining is configured to determine a type of services provided through the particular component carrier, and is configured to determine whether to perform the interference suppression or a type of interference suppression to perform based on the determined type of services provided through the particular component carrier.

23. The apparatus of claim 13, wherein the means for determining is configured to determine whether the particular component carrier utilizes licensed spectrum or unlicensed spectrum, and is configured to determine whether to perform the interference suppression or a type of interference suppression to perform based on whether the particular component carrier utilizes licensed spectrum or unlicensed spectrum.

24. An apparatus for wireless communication, the apparatus including a user equipment (UE), the apparatus comprising:
a memory; and
at least one processor coupled to the memory and configured to:
receive interference suppression information from a base station;
receive a transmission through at least one component carrier of a plurality of component carriers; and
for each component carrier of the at least one component carrier, determine
whether to perform interference suppression on a particular component carrier, and
a type of interference suppression to perform on the particular component carrier based on a configuration associated with the particular component carrier and the interference suppression information when it is determined to perform interference suppression on the particular component carrier.

25. The apparatus of claim 24, wherein the at least one processor is configured to determine by
determining whether the UE has allocated processing resources for performing interference suppression on the particular component carrier based on at least one of:
prior processing resources allocated to perform interference suppression,
a number of component carriers in the a plurality of component carriers, or
a priority associated with the particular component carrier and, wherein the at least one processor is further configured to
perform interference suppression on the particular component carrier when it is determined that the UE has the allocated processing resources.

26. The apparatus of claim 24, wherein the at least one processor is configured to determine by
determining whether the particular component carrier is a primary component carrier or a secondary component carrier, and
the at least one processor is further configured to:
perform interference suppression on the particular component carrier when the particular component carrier is determined to be a secondary component carrier.

27. The apparatus of claim 26, wherein the at least one processor is further configured to:
refrain from performing interference suppression on the particular component carrier when the particular component carrier is determined to be a primary component carrier; and
process the primary component carrier in accordance with an enhanced inter-cell interference coordination (eICIC).

28. A non-transitory computer-readable medium storing computer executable code at a user equipment (UE), comprising code to:
receive interference suppression information from a base station;
receive a transmission through at least one component carrier of a plurality of component carriers; and
for each component carrier of the at least one component carrier, determine
whether to perform interference suppression on a particular component carrier, and
a type of interference suppression to perform on the particular component carrier based on a configuration associated with the particular component carrier and the interference suppression information when it is determined to perform interference suppression on the particular component carrier.

29. The non-transitory computer-readable medium of claim 28, wherein the code is further configured to
determine whether the UE has allocated processing resources for performing interference suppression on the particular component carrier based on at least one of:
prior processing resources allocated to perform interference suppression,
a number of component carriers in the a plurality of component carriers, or a priority associated with the particular component carrier, wherein the code is further configured to perform interference suppression on the particular component carrier when it is determined that the UE has the allocated processing resources.

30. The non-transitory computer-readable medium of claim 28, wherein the code is configured to determine by determining whether the particular component carrier is a primary component carrier or a secondary component carrier, and
the code is further configured to:
perform interference suppression on the particular component carrier when the particular component carrier is determined to be a secondary component carrier.

\* \* \* \* \*